United States Patent
DeSorbo et al.

(10) Patent No.: US 7,293,924 B2
(45) Date of Patent: Nov. 13, 2007

(54) SHOULDER MOUNTED SUPPORT ASSEMBLY TO HOLD CAMERA OR CAMCORDER

(75) Inventors: Alexander P. DeSorbo, Woodbury, CT (US); Carl A. Hultman, Derby, CT (US); Joseph P. Teodosio, Seymour, CT (US)

(73) Assignee: Anton/Bauer, Inc., Shelton, CT (US)

( * ) Notice: Subject to any disclaimer, the term of this patent is extended or adjusted under 35 U.S.C. 154(b) by 0 days.

(21) Appl. No.: 10/811,747

(22) Filed: Mar. 29, 2004

(65) Prior Publication Data

US 2004/0212788 A1    Oct. 28, 2004

Related U.S. Application Data

(63) Continuation of application No. 10/431,912, filed on May 8, 2003, now Pat. No. 6,929,409.

(60) Provisional application No. 60/441,365, filed on Jan. 21, 2003.

(51) Int. Cl.
*G03B 17/00* (2006.01)

(52) U.S. Cl. ...................................... 396/420; 396/422

(58) Field of Classification Search ................ 396/419, 396/420, 421, 422, 428; 248/187.1
See application file for complete search history.

(56) References Cited

U.S. PATENT DOCUMENTS

| | | | |
|---|---|---|---|
| 2,636,822 A | 4/1953 | Anderson | |
| 2,873,645 A * | 2/1959 | Horton | 396/420 |
| 3,490,724 A * | 1/1970 | Kichitaro | 248/178.1 |
| 4,244,500 A * | 1/1981 | Fournier | 396/428 |
| 4,509,795 A * | 4/1985 | Brennan et al. | 297/423.32 |
| 4,727,390 A | 2/1988 | Brown | |
| 4,976,387 A | 12/1990 | Spianti | |
| 5,294,947 A | 3/1994 | Harrington | |
| 5,890,025 A | 3/1999 | Hart | |
| 6,056,449 A | 5/2000 | Hart | |
| 6,601,999 B1 | 8/2003 | McTeer | |
| 6,929,409 B2 | 8/2005 | DeSorbo et al. | |
| 2002/0067922 A1 | 6/2002 | Harris | |

* cited by examiner

*Primary Examiner*—Christopher Mahoney
(74) *Attorney, Agent, or Firm*—McCormick, Paulding & Huber LLP

(57) ABSTRACT

A lightweight collapsible, shoulder mounted camera support assembly for carrying a camcorder or camera and holding the same steady during operation has a front and rear portion for mounting a battery to counterbalance the weight of the camera or camcorder mounted on the front portion. The front and rear portions are collapsible or detachable to aid in transporting and carrying the shoulder mounted camera support. The front and rear portions are offset in such a way as to match the centerline of the camera with the centerline of the shoulder and thus aligned with the operator's eye. The front portion has an angular extension on which the camera or camcorder is mounted and is adjustable in at least one axis relative to the horizontal established by the support assembly.

12 Claims, 5 Drawing Sheets

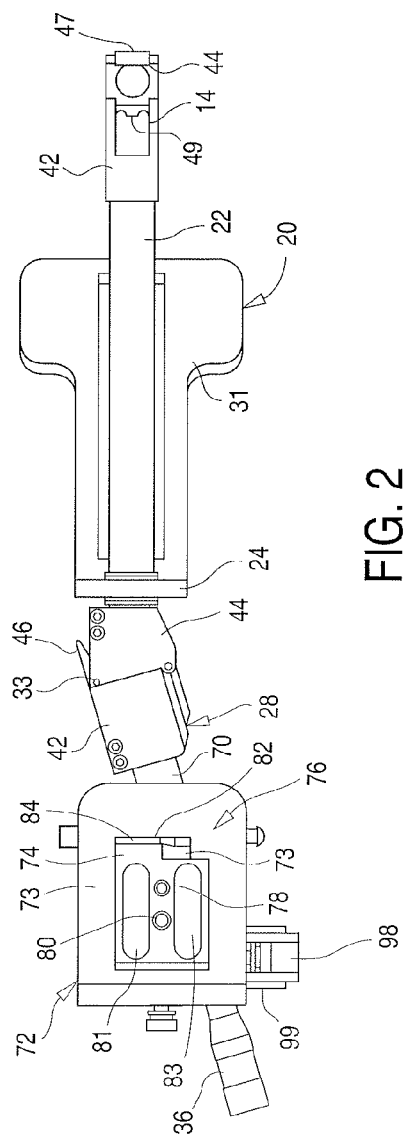
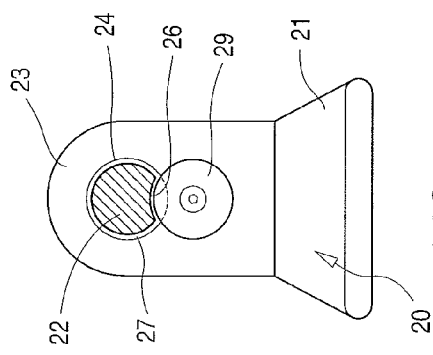

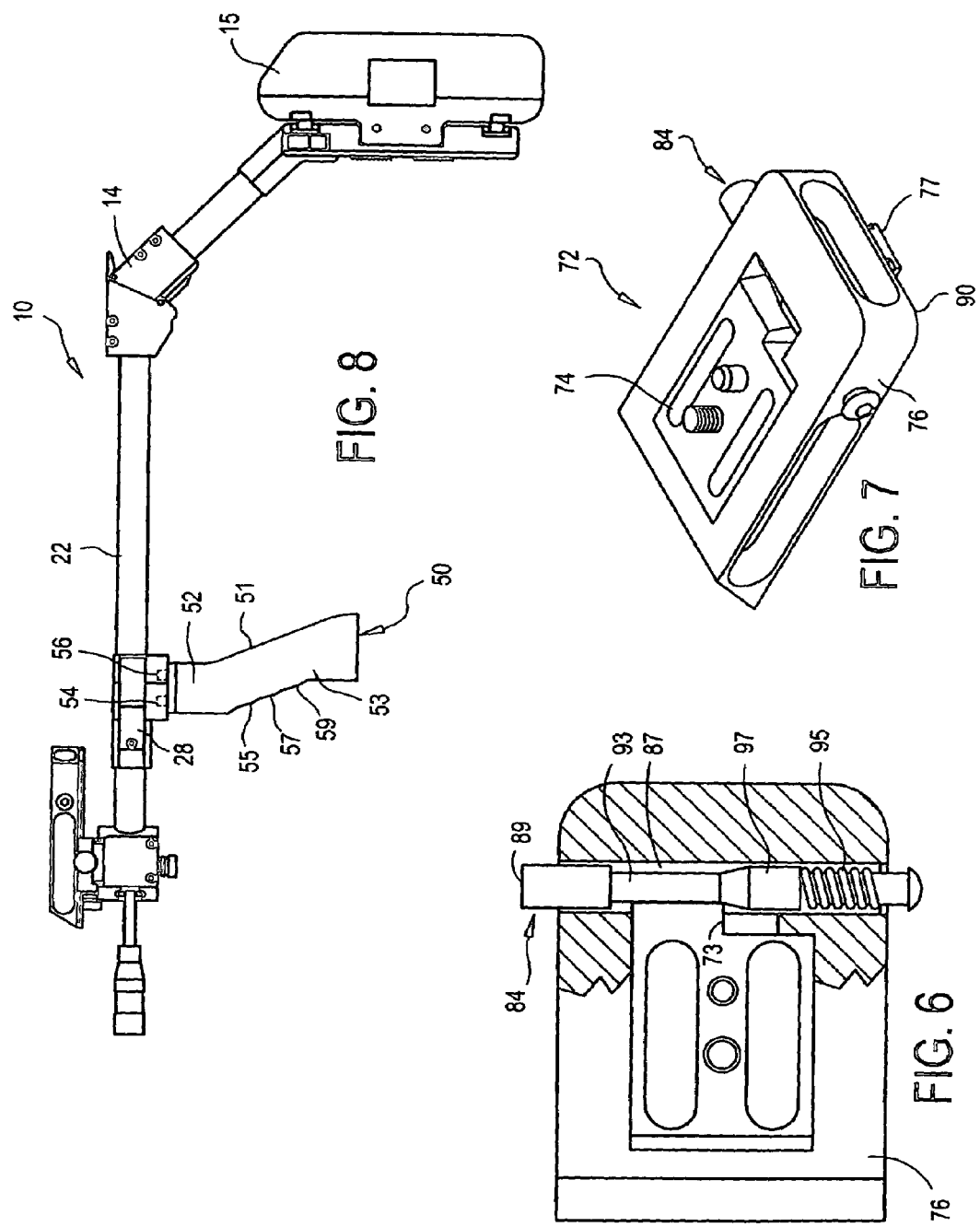

SHOULDER MOUNTED SUPPORT ASSEMBLY TO HOLD CAMERA OR CAMCORDER

CROSS-REFERENCES TO RELATED APPLICATION

This application is a continuation of U.S. patent application Ser. No. 10/431,912, filed May 8, 2003, now U.S. Pat. No. 6,929,409, which claims priority from U.S. Provisional Patent Application Ser. No. 60/441,365, filed Jan. 21, 2003, the entirety of all of which are incorporated herein by reference.

BACKGROUND OF THE INVENTION

1. Field of the Invention

The present invention relates to a shoulder mounted support device to hold a camera or a camcorder. Specifically, the present invention relates to a lightweight, shoulder mounted device for supporting a camera or a camcorder on an operator's shoulder and body providing stability with minimal manual support and is suitable for use with film or video cameras.

2. Description of the Prior Art

One of the major challenges faced in filming moving objects or activities with varied speed, for example, while skiing, is stabilizing the camera, even though many modern video cameras have built-in electronic image stabilizing circuitry. While these circuits are helpful in reducing the minor fluctuations of camera movement they cannot distinguish between purposeful movement of the camera and accidental movement as a result of operator fatigue. Moreover the frequent use of long lenses and digital zoom capabilities of cameras requires the physical stabilization of the camera in order to minimize the camera's movement which otherwise would result in image shifts several times that of the camera movement.

Various solutions are available to assist with this problem, for example, tripods, monopods, and different types of frame assemblies. Tripods can stabilize the camera movement but restrict portability. Frame assemblies for mounting cameras on the human body for stabilization are typically not designed for the size, weight and ergonomics of the small, palm-sized handheld digital cameras of today.

Older video cameras by example, while larger and heavier, had the advantage of a design, which required them to be rested on the operator's shoulders. The viewfinder of these cameras was positioned outboard of the camera body and toward the operator thereby placing it in a natural position in front of the operator's eye. The overall weight of the camera was borne on the operator's shoulder with the center of gravity of the camera being placed on the point of the operators shoulder.

With the advent of smaller "palm-sized" handheld camcorders, the viewfinder is typically placed on the centerline of the camcorder and all of the camcorders weight is borne on the operators' arm in front of his body. During prolonged filming, the ergonomics of the camcorder design lead to operator fatigue and camera instability, thereby reducing the quality of the recorded images as the camera shakes and shudders as a result.

An example of a frame assembly for supporting a camera is disclosed in U.S. Pat. Nos. 5,890,025 and 6,056,449 issued to Hart. The assembly is comprised of a rigid frame having a front and a rear portion with a pair of shoulder rests constructed to rest on the shoulders of the wearer. This type of device has the disadvantage of being bulky, cumbersome and heavy, defeating the ergonomics and the performance of the small handheld cameras or camcorders.

SUMMARY OF THE INVENTION

Thus, there is a need for an improved support for a small camera or camcorder that is self-stabilizing, lightweight, portable, requires minimal support from the operator and optimizes the ergonomics and performance of small handheld cameras or camcorders. The shoulder mounted camera support assembly described herein provides a solution for that problem.

It is therefore an objective of the present invention to provide a shoulder mounted camera support that allows the camera to be self-balanced on the operator's shoulder. It is a further objective of the present invention to provide a support device for a camera or camcorder, which is lightweight, portable, stable, easily manipulated by the operator and improves the functionality of the camera by easily adapting to other accessories and can be set up quickly.

Another objective of the invention is to provide a shoulder mounted camera support with collapsible or detachable members thereby requiring minimal storage space and is easily assembled or disassembled for flexible use with a variety of cameras or camcorders.

A further objective of the present invention is to provide a shoulder mounted camera support with means to attach the camera or camcorder camera mount securely yet capable to quick release for operation in a variety of filming situations and applicable to a variety of cameras.

Yet another object of the invention is to provide a shoulder mounted camera support with means to mount and adjust a variety of cameras so that the viewfinder of the camera or camcorder can be aligned with the operator's eye.

In accordance with the above-stated objects, the present invention provides a collapsible or detachable shoulder mounted camera support for holding a camera or a camcorder while filming or recording. The device is comprised of modular units having a front and a rear portion stabilized on the shoulder of the operator by using the battery powering the camera or camcorder as a counterweight. Any appropriate lightweight, sturdy and easily fabricated material with sufficient strength to hold a camera or a camcorder, such as plastic or metal may be used to construct the present assembly.

In one embodiment of the invention, the shoulder mounted camera support is collapsible with a pair of pivot knuckles operating about a rotary axis (X and Y-axes, respectively) connecting the front and the rear portions of the shoulder mounted camera support and provide for the breakdown of the device for easy transport. This feature also allows the camera support to be collapsed and positioned on a flat surface serving as a base so that the device can be converted to a pod for supporting the camera or camcorder while filming.

The front portion has a clutch-operated slideable breastplate hingedly connected to a horizontal supporting shaft, which rests on the operator's chest securing the camera support assembly to the operator's body for stability. The breastplate also serves to support the forward weight of the camera, relieving the operator's arm. The clutch on the breastplate enables the breastplate to be adjusted securely in a comfortable, non-movable position against the operator's body. An additional pivot knuckle extends from the front portion of the shoulder mounted camera support with a second horizontal supporting shaft for slideable attachment to a camera shoe and mount assembly. This second horizontal supporting shaft is oriented slightly off-center from the axis of the first horizontal shaft by a foldable knuckle aiding in the collapsibility of the device for transportation purposes. The second horizontal supporting shaft is oriented at approximately 16° from the first shaft providing for the in-line or linear alignment of the camera's viewfinder relative to the operator's eye and relative to the centerline of the operator's shoulder. The front pivot knuckle rotates about a vertical axis (Y-axis).

The camera or camcorder can be affixed directly to the second horizontal shaft or mounted on a shoe and mount assembly that is slideably connected to the second, angled, horizontal shaft portion of the shoulder mounted camera support for adjustably positioning the camera or camcorder in a horizontal plane. The shoe and mount assembly can be adjusted for use with a variety of cameras or camcorders as the shoe is in mating engagement with the bottom of the camera or camcorder unit. The shoe is loaded into the mount and is retained in place by a spring biased locking means for interaction with a surface of the shoe.

A channel-shaped-groove is provided on the base of the mount for engagement with a complementary perpendicular channel-shaped-groove that is fitted with a slide to be slideably connected to a mounting bracket that is disposed at the front of the shoulder mounted camera support for adjustment of the camera or camcorder's position in a horizontal plane.

In the preferred embodiment, the rear portion of the shoulder mounted camera support assembly is detachably connected to a battery pack which provides power for the camera and additional power for accessories, such as a camera light or wireless microphone receivers, and provides additional counter-balancing for the camera or camcorder.

The shoulder mounted camera support may be mounted to a stationary stabilizing device, such as a tripod or monopod, in lieu of the operator's shoulder and body.

In one embodiment of the invention, the front portion of the shoulder mounted camera support assembly is detachable as the pivot knuckles are substituted with a releaseable connector to allow further disassembly for convenient storage and transport.

In another embodiment of the invention, a detachable pistol grip is threadably attached to the bottom of the shoulder mounted camera support by appropriate securing means, for example, nuts, bolts, pins, threaded fasteners, screws or some combination thereof.

The pistol grip is releasably attached to the front portion of the shoulder mounted support assembly, and can be used with a variety of camcorders or cameras yet still maintain the proper gravitational balance while supporting the camcorder. The pistol grip may house the camcorder's supplemental controls or battery pack within the housing. The pistol grip is compact and lightweight and capable of being used by ether the right or the left hand promoting maneuverability of the camcorder without creating fatigue after prolonged use.

BRIEF DESCRIPTION OF THE DRAWINGS

Further objectives and advantages of the invention will become more apparent from the following description and claims, as from the accompanying drawings, wherein:

FIG. 2 is a top plan view of the shoulder mounted camera support of FIG. 1;

FIG. 4 is a cross-sectional view taken substantially along the plane indicated by line 4-4 of FIG. 1;

FIG. 6 is top plan view, partly in section of the camera or camcorder mount of the shoulder mounted camera support assembly; and FIG. 7 is a view similar to FIG. 6 with a shoe connected to the camera or camcorder locked to the mount.

FIG. 8 is a side view in elevation view of the pistol grip assembly attached to the shoulder mounted camera support assembly.

DETAILED DESCRIPTION OF THE PREFERRED EMBODIMENT

Figure 1:
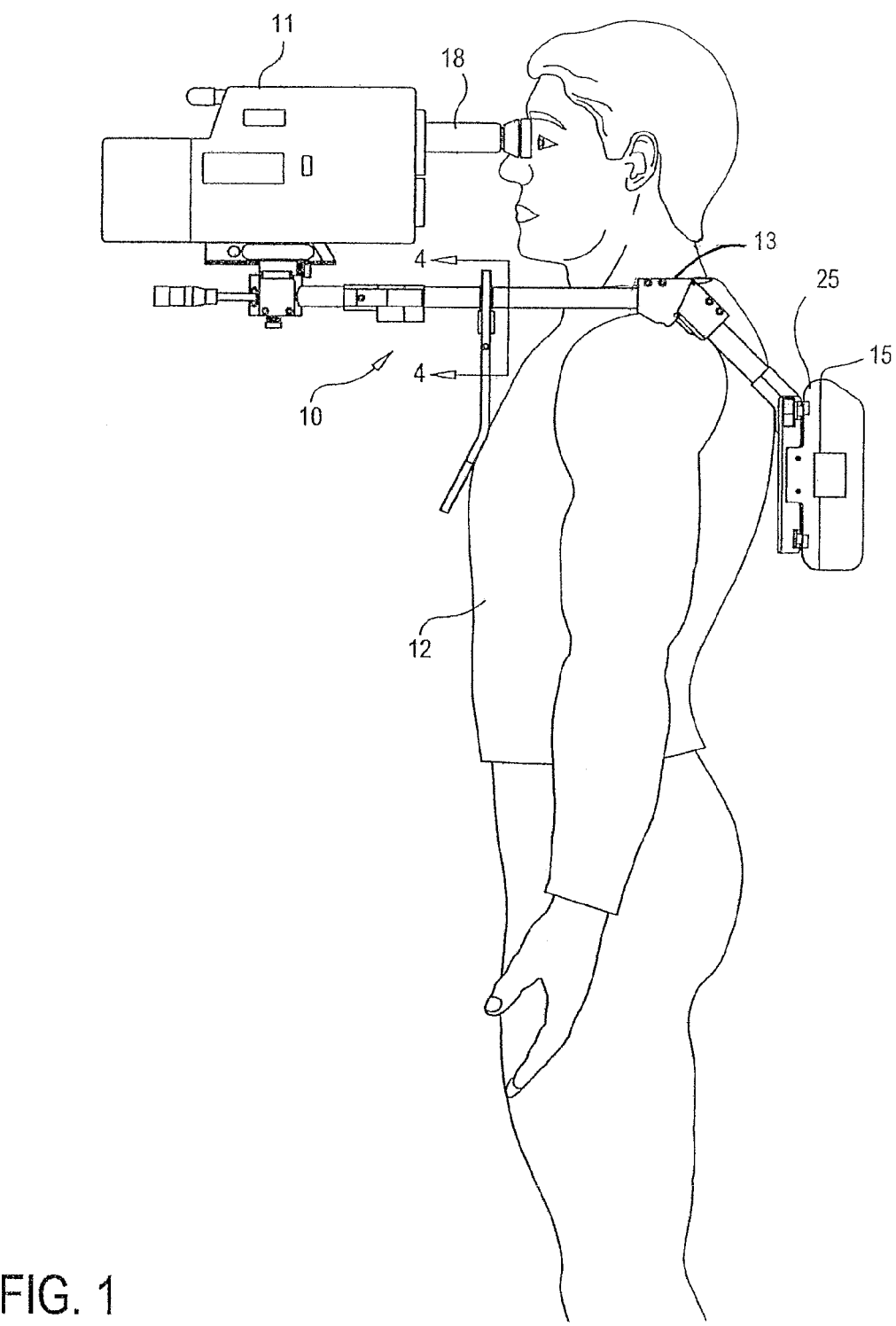
FIG. 1 is a side view of the shoulder mounted camera support assembly according to the present invention in use by an operator.

Referring now to the drawings in detail, wherein like numerals indicate like elements throughout the several views in accordance with the invention. A camera or camcorder 11 can be mounted on a shoulder mounted camera support assembly 10 constituting the subject of the present invention.

FIG. 1 is a side view of the shoulder mounted camera support assembly 10 according to the present invention in use by an operator 12 where the shoulder mounted camera support assembly 10 is independently supported and stabilized on the operator's shoulder 13. The shoulder mounted camera support assembly 10 comprises a front portion to which the camera or camcorder 11 is attached and a rear portion for receipt of a battery pack 15.

Figure 3:
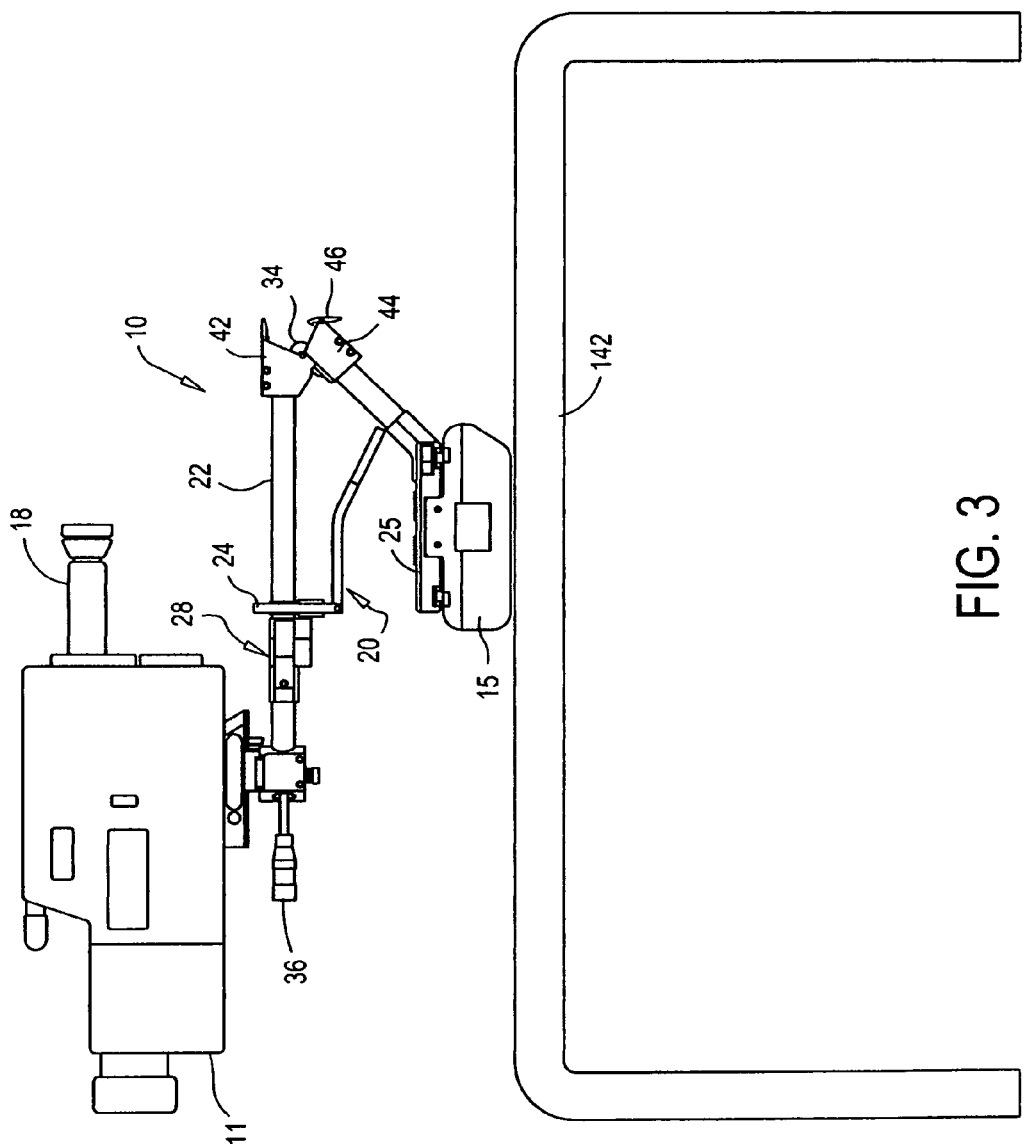
FIG. 3 is a side view of the shoulder mounted camera support assembly in use as a pod seated on a flat surface.

FIG. 2 is a top view and FIG. 3 an enlarged side view of the camera support assembly 10 for the camera or camcorder 11. The front portion of the shoulder mounted camera support 10 has a hollow shaft 22 projecting horizontally and forwardly from a rear pivot knuckle 14, through which a flexible power cable 34 (not shown) can be threaded from a power source, such as a battery pack 15, to the camcorder or camera 11. The power cable 34 (not shown) terminates at an electrical connector 36 of the type that is well known and used in the art for ready connections to a camera or camcorder 11.

As shown in FIG. 4, extending perpendicularly from the horizontal shaft 22 is a breastplate 20 that is rotatable about a binge 21 intermediate its length. The upper portion 23 of the breastplate 20 is mounted on the horizontal shaft 22 of the shoulder mounted camera support assembly 10 through a bushing 24 provided with a circular aperture 27 in the bushing 24 receiving the horizontal shaft 22 there through. The bushing 24 has a cam 29 mounted on opposite sides of the bushing 24 on the opposite sides of the upper portion of the breastplate 20 such that a portion of the circumference of each cam 29 seats exactly in a arced groove 26 formed on the bottom of shaft 22 when the upper portion 23 of breastplate 20 is perpendicular to horizontal shaft 22 as shown in FIG. 4, such that the breastplate 20 can be slideably adjusted along the shaft 22, yet locked into a desired position when the bottom hinged portion 31 is extended by pivoting it about hinge 21 into contact with the chest of the operator 12 which cants the cams 29 into frictional clutching engagement with the groove 26 in the bottom of shaft 22. The breastplate 20 may be partially folded, collapsing inward from its use position illustrated in FIG. 1 and slideably adjusted at varying positions on the horizontal shaft 22 when the rear potion of the shoulder mounted camera support assembly 10 is collapsed into a pod as further described in conjunction with in FIGS. 3 and 5.

The clutched breastplate 20 extends downwardly approximately 6 inches from the bushing 24 and is arched at an angle in the middle of the breastplate 20 such that the breastplate 20 readily abuts with the operator's chest as shown in FIG. 1. The shape of the breastplate 20 allows it to be easily tilted to conform to the operator's desired fit. The breastplate 20 may comprise of any shape that safely and comfortably fits an operator's chest.

In another embodiment of the invention, the breastplate 20 may be replaced with a pistol grip 50. The pistol grip 50 is constructed with a detachable elongated firm handle 52 portion that is secured to the shoulder mounted camera support assembly 10 by appropriate securing means, for example, nuts, bolts, pins, threaded fasteners, screws or some combination thereof. The pistol grip 50 is attached to the bottom of the camera support assembly 10 by a threaded fastener 54 and a retractable locating pin 56 as seen in FIG. 8. This secures the pistol grip 50 into the preferred position for maneuvering and operating the shoulder mounted camera support assembly 10.

The pistol grip 50 is releasably attached to the shoulder mounted camera support assembly 10 and includes the circuitry to control one or more functions of the camera or camcorder 11, such as power, zooming, iris and focus among others. When attached, the pistol grip 50 assists in the maneuvering and operability of the camera or camcorder 11 which position is maintained by the counterbalance of the battery pack 15 on the rear of the shoulder mounted camera support assembly 10, positioned over the shoulder 14 and along the back of the operator 12.

The elongated firm handle 52 may be of a hollow or solid construction with a solid rectangular top portion 58 for ready annexation to the support's pivot knuckle 28. The rear portion 51 of the elongated firm handle 52 may be angled for a comfort fit, whereas the front portion 53 of the elongated firm handle 52 may be contoured with raised finger positions 55, 57 and 59 for added comfort.

The pistol grip 50 may also be attached directly to the bottom of the camera or camcorder 11 in such a manner as to preclude tipping or canting of the camera or camcorder 11 by balancing the camcorder or camera 11 on the pistol grip 50 by appropriate location of the pistol grip 50 relative to the weight of the camera 11. However, the wrist and arm of the operator 12 could become subject to fatigue, if used for an extended period of time.

The horizontal shaft 22 shown in FIG. 2 is also connected at the distal end to a front pivot knuckle 28 and may be secured to the front pivot knuckle 28 by welding, a threaded fastener or any other appropriate securing means. In the preferred embodiment, the horizontal shaft 22 is threadedly connected to the pivot knuckle 28.

The pivot knuckle 28, as with the pivot knuckle 14 has two opposed parts 42, 44 in mating engagement with each other and are connected together by a hinge 33. The opposed faces of the pivot knuckle 28 and 14 pivot on hinge 33; the only difference is that the parts 42, 44 of knuckle 14 pivot along the X-axis and parts 42, 44 pivot along a Y-axis when a pivotal latch lock 46 on rear face 44 having a hook end 47 received over a mating surface 49 on part 42 is released. This construction allows the front portion of the shoulder mounted camera support assembly 10 to swivel about an X and Y axis and collapse about the hinged knuckles 14 and 28 for ease of transportation and housing as shown in the collapsed configuration indicated in FIG. 5.

Figure 5:
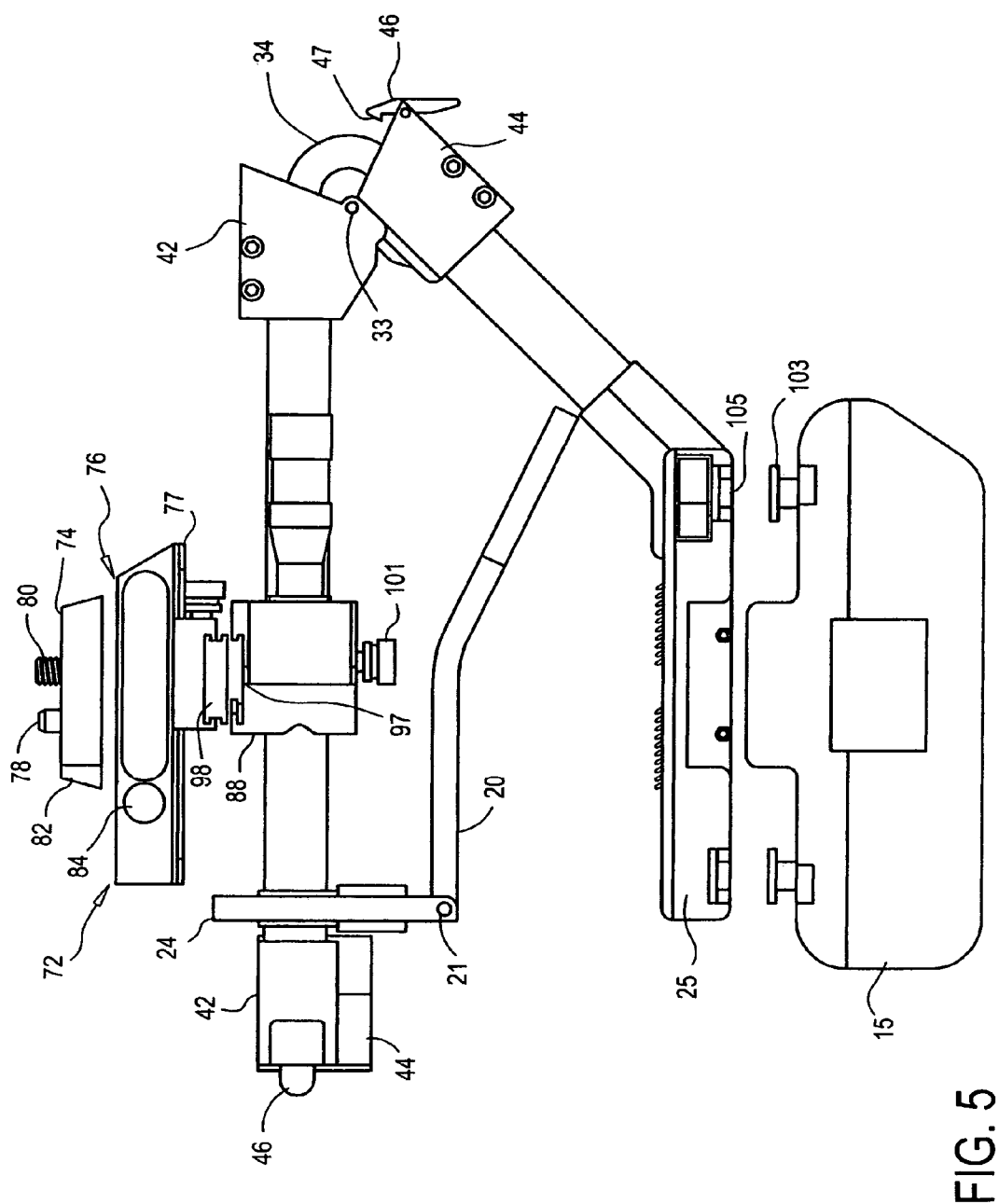
FIG. 5 is an enlarged, exploded side view of the shoulder mounted camera support assembly collapsed for storage or transport.

Projecting from the second part 42 of pivot knuckle 28 is a horizontal supporting shaft 70 for slideably attaching a camera or camcorder shoe and mount assembly 72 illustrated in detail in FIGS. 2 and 5. The horizontal shaft 70 is offset at a nominal angle of 16° to the axis of shaft 22 to accommodate the linear alignment of the camera's or camcorder's viewfinder 18 with the operator's eye.

A shoe and mount assembly 72 is configured for the shoe 74 to be in mating engagement with the bottom of the camera or camcorder 11. As seen in FIG. 5, the shoe 74 is detachable and is dimensioned to center fit a corresponding indent 73 in the top surface 75 of the mount 76. The shoe 74 is configured with a locating pin 78 to be placed in a an aperture (not shown) in the bottom of the camera or camcorder so as to enable a threaded connector 80 to be threadedly connected into a threaded receiving recess (not shown) in the bottom of the camera or camcorder 11. The top surface 82 of the shoe has abrasion pads 81, 83 for frictional engagement with the bottom of the camera or camcorder 11.

Once assembled to the camera or camcorder 11, the shoe 74 may be loaded into the mount 76 and is retained in position by locking means 84. The locking means 84 includes a spring-biased pin 85 held captive within a slot 87 as shown in FIGS. 6 and 7.

Pushing inward on the head 89 of pin 85 against the bias of spring 95 as shown in FIG. 6 positions an undercut or thinner diameter portion 93 of the pin 85 adjacent to the projecting cam surface 82 of shoe 74 so the shoe can be positioned wholly within recess. Release of head 89 enables a thicker beveled portion 97 of the pin shaft or body to abut a portion of downwardly angled cam surface 82 to lock the shoe against removal.

The base of the mount 76 is connected to a horizontal slide assembly 77 which is slideably mounted on bracket 88 by relatively slideable, perpendicularly oriented channel members 98,99 that are disposed on the shaft 70 of the shoulder mounted camera support assembly 10 and held in adjusted position by thumb screws 101. The mounting bracket 88 is oriented slightly off-center to shaft 70 to perfect the alignment of the camcorder's viewfinder 88 relative to the operator's eye using the sliding adjustments in the X and Y directions in a horizontal plane.

The rear portion of the shoulder mounted camera support 10 comprises of a unitary hollow shaft 18 where the power cable 34 can be directed from the battery pack 15 to the camcorder 11. The hollow shaft 18 is secured to the rear pivot knuckle 14 by welding, a threaded fastener or any other appropriate securing means. This hollow shaft 18 in this embodiment may extend downward at an angle from the rear pivot knuckle 14 to a plate 25 for ready connection to the male plate on a battery pack 15. The battery pack 15 serves as a counterbalance for the camera or camcorder 11 positioned on mounting bracket 88, so the camera or camcorder is level and parallel to the ground.

In the preferred embodiment, the male plate of the battery pack is received on a female plate 25 of the type that is shown in U.S. Pat. No. 4,810,204 to Wilson. The substantially flat male plate of the battery pack 15 has a plurality projections 103 received within slots 105 on the female plate 25 and female electrical terminals positioned within a recess for engagement with male electrical terminals on the female plate. Thus, the female and male plates of the battery pack 15 can be coupled and locked together. The assembled battery pack with plates can be attached to the rear portion of the shoulder mounted camera support assembly 10 counter-balancing the front portion of the shoulder mounted camera support assembly 10 providing independent stability without manual support.

FIG. 3 illustrates a side view of the shoulder mounted camera support assembly 10 in use on a flat surface, as a pod, or camera or camcorder support in lieu of a tripod. As seen in FIG. 3, the rear portion of the shoulder mounted camera support 10 is collapsed at the rear part 44 of the pivot knuckle 14 to create a pod that can be mounted and rotated on a flat surface 142 or attached to a one-legged support (not shown).

The rear pivot knuckle 14 has two opposed parts 42, 44 in mating engagement with each other and are connected together by hinge 33. The opposed faces of the pivot knuckle 14 when released from the latch lock 46 pivots about-hinge 33 the X-axis downwardly extending at an angle of approximately 120° between the secured and unlatched position of the latch lock 46. When the rear portion of the shoulder mounted camera support 10 is rotated open, the breastplate 20 can be partially folded, collapsing inward from the pivot hinge 21 which connects the upper and lower portions of the breastplate 20 to accommodate the extension of the rear pivot knuckle 14.

We claim:

1. An assembly for supporting a battery and one of a camcorder and a camera on a human body, the assembly comprising:
    a first portion having a lower surface, an upper surface, a first end and a second end, the first portion adapted to physically engage the camera at a point proximal to the first end of the first portion;
    a second portion having a lower surface, an upper surface, a first end and a second end, the second portion adapted to physically engage the battery at a point proximal to the first end of the second portion;
    an articulation portion joining the second end of the first portion to the second end of the second portion so that an obtuse angle is formed between the lower surface of the first portion and the lower surface of the second portion;
    a breastplate secured to the first portion and extending downward there from, the breastplate being selectively positionable along at least a partial length of the first portion.

2. The assembly according to claim 1, wherein the first portion further includes a plurality of locking points, the breastplate being frictionally lockable to the first portion at at least one locking point.

3. The assembly according to claim 2, wherein the at plurality of locking points is an arced groove.

4. The assembly according to claim 3, wherein the first portion includes a shaft, the shaft including the plurality of arced grooves.

5. The assembly according to claim 4, wherein the breastplate includes:
    an opening for receiving the shaft; and
    a locking assembly to frictionally lock the breastplate to the shaft at at least one arced groove.

6. The camera support assembly according to claim 5, wherein the breastplate further comprises a first section and the locking assembly further includes:
    a bushing circumferentially affixed to the opening, the bushing arranged to receive the shaft; and
    a cam affixed to the first section adjacent the bushing, the cam being lockable to the arced groove.

7. The camera support assembly according to claim 6, wherein the cam locks the breastplate with the arced groove when the breastplate is substantially perpendicular to the shaft.

8. The assembly according to claim 7, wherein the breastplate further comprises a second section opposite the first section, the second section being positionable against the human body, the breastplate being substantially perpendicular to the shaft when the breastplate is positioned against the human body.

9. The assembly according to claim 8, wherein the first section and the second section have respective points of articulation, the first section and the second section being coupled at the respective points of articulation.

10. The assembly according to claim 2, wherein the first portion includes a shaft, the shaft including the plurality of locking points.

11. The assembly according to claim 10, wherein the breastplate further includes:
    an opening for receiving the shaft; and
    a locking assembly to frictionally lock the breastplate to the at least one locking point.

12. The assembly according to claim 11, wherein the breastplate further comprises a first section and the locking assembly further includes:
    a bushing circumferentially affixed to the opening, the bushing arranged to receive the shaft; and
    a cam affixed to the first section adjacent the bushing, the cam being lockable to the locking point.

* * * * *